Figure 1:
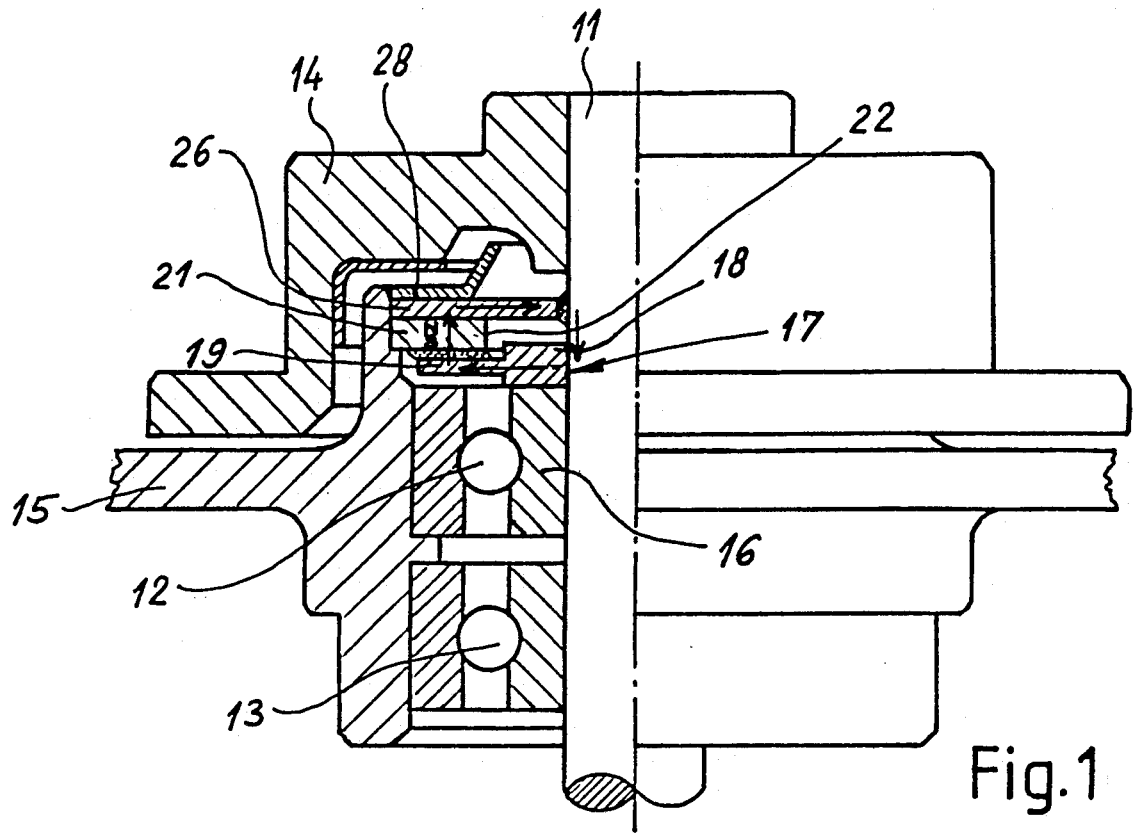

United States Patent [19]

Cap

[11] Patent Number: 5,011,165
[45] Date of Patent: Apr. 30, 1991

[54] SEALING DEVICE ESPECIALLY FOR HARD DISK DRIVES

[75] Inventor: Heinrich Cap, Peterzell, Fed. Rep. of Germany

[73] Assignee: Papst-Motoren GmbH & Co. KG, St. Georgen, Fed. Rep. of Germany

[21] Appl. No.: 345,932

[22] Filed: May 1, 1989

[30] Foreign Application Priority Data

Apr. 29, 1988 [DE]  Fed. Rep. of Germany ... 8805661[U]
Aug. 18, 1988 [DE]  Fed. Rep. of Germany ....... 3828081

[51] Int. Cl.$^5$ ........................ F16J 15/40; F16J 15/54
[52] U.S. Cl. ..................................... 277/80; 277/135; 384/133
[58] Field of Search ...................... 272/135, 80, 13, 25, 272/67, 133; 384/133, 446, 472, 478, 8, 135

[56] References Cited

U.S. PATENT DOCUMENTS

| | | | |
|---|---|---|---|
| 2,622,945 | 12/1952 | Nickle et al. | 277/133 X |
| 2,861,848 | 11/1958 | Lovelock et al. | 384/472 X |
| 3,889,983 | 6/1975 | Freize et al. | 277/135 X |
| 4,103,759 | 8/1978 | Erich et al. | 384/472 X |
| 4,557,490 | 12/1985 | Tavares | 277/80 |
| 4,673,997 | 6/1987 | Gowda et al. | 277/80 X |
| 4,694,213 | 9/1987 | Gowda et al. | 384/133 X |
| 4,810,108 | 3/1989 | Yajima | 384/488 |
| 4,817,964 | 4/1989 | Black, Jr. | 384/133 X |

Primary Examiner—Allan N. Shoap
Assistant Examiner—Scott Cummings
Attorney, Agent, or Firm—Fitch, Even, Tabin & Flannery

[57] ABSTRACT

A seal includes a magnetic circuit having a permanent magnet providing excitation. A rotatable shaft has a straight cylindrical outer surface and is supported in a ball bearing system. A magnetically conductive bearing ring is mounted on the shaft immediately adjacent one end of the bearing system. The bearing ring has two radial portions of different thicknesses, the outer portion being thinner than the inner portion adjacent the shaft. A permanent magnet ring is located adjacent the bearing ring on the side opposite the bearing system. A labyrinth gap is defined between the bearing system and the permanent magnet ring on both sides of the bearing ring radially extending therebetween, and a ring pole is located axially adjacent the permanent magnet ring on the opposite side of the bearing system. An active pole gap is defined between the inner diameter of the ring pole and the shaft and is filled with a magnetically conductive fluid, the gap being essentially in series with the labyrinth gap.

8 Claims, 1 Drawing Sheet

SEALING DEVICE ESPECIALLY FOR HARD DISK DRIVES

The present invention concerns a magnetic fluid seal.

A seal of this type is described in the utility document DE-GM 87 02 472, for example. This type of seal generally consists of one or two flat disks provided with an axially magnetized permanent magnet between them. The disk or disks are made from a magnetically conductive material and form a pole shoe for each air gap. At least one of these air gaps is filled with a magnetically conductive fluid (ferrofluid) and thus provides a seal between two chambers. The relatively small air gap surfaces provide a weak effective magnetic field. In addition, seals which are no longer serviceable, as a result of distortion or which are no longer leakproof because of aging or exposure, allow particles to escape from the motor bearing cavities, i.e. from one chamber into the other, which could result in the failure of a hard disk drive, for example.

The purpose of the present invention is to provide an improvement to the said type of seal and also to maintain its sealing function, even after loss of the fluid.

A bearing ring according to the present invention serves to fix and support the ball bearing on the motor drive shaft in an axial direction, on the one hand, and provides a disk-shaped section for improved magnetic flux, on the other hand, thus allowing a reduction in the size of the permanent magnet in the seal.

Further details and other advantageous embodiments of the present invention will be developed in the following examples and illustrated in the drawings, as well as in the claims.

Figure 2:
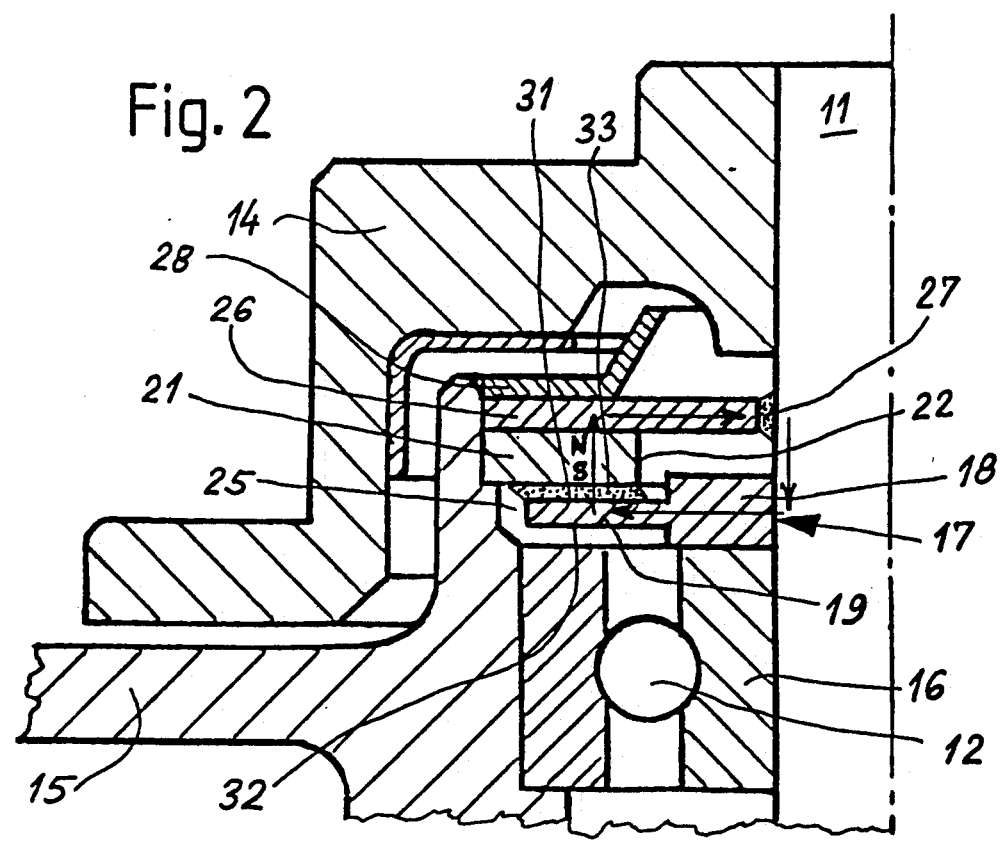

In the drawings, FIG. 1 shows a half-section of a seal according to the present invention, and, FIG. 2 shows an enlarged partial section of the seal according to FIG. 1.

FIGS. 1 and 2 show only the essential parts of a drive of the type which is used in data storage disk drives, for example. A shaft 11 of a drive motor, not shown here, is supported in ball bearings 12, 13. At one end of the shaft 11 a fixed hub 14 is arranged which provides a central mounting for hard disks. The ball bearings 12, 13 are fitted in a drilling in a motor flange 15. To prevent axial displacement of inner ring 16 of the ball bearing 12 fastened on the shaft 11, a magnetically conductive bearing ring 17 is force-fitted on the shaft 11 which exerts a predetermined load on the inner ring 16. The bearing ring 17 is provided with two portions seen in the radial direction: an inner portion shaped like a sleeve 18 and an outer disk-shaped portion 19, which can be especially well seen in FIG. 2. The bearing ring is preferably made in one piece. The disk-shaped portion 19 consists of two essentially flat parallel surfaces 31, 32 which are arranged perpendicular to the shaft 11 (FIG. 2). The upper surface 31 lies opposite one leading edge of a permanent magnet 21, whereas the lower surface 32 is arranged facing the upper leading edge of the ball bearing 12.

The ball bearing in this instance is not employed to close the magnetic circuit and consequently does not attract small particles which might destroy the raceways. Furthermore, ball bearing steel does not possess good magnetic properties.

The disk-shaped permanent magnet 21 is arranged above the bearing ring 17 and very close to it in an axial direction. The outer diameter of said permanent magnet is retained in the drilling in the motor flange 15, whereas the sleeve-shaped portion zone 18 of the bearing ring 17 projects axially in the inner drilling 22 in in the permanent magnet 21 at a predetermined clearance. The sleeve-shaped portion 18 projects axially beyond the disk-shaped section 19.

The arrangement described above provides a labyrinthine gap 25 of an essentially U-shaped cross section around the perimeter of the bearing ring 17.

Above the permanent magnet 21 a ring pole 26 is fastened, whose outer surface, like that of the permanent magnet 21, is located concentrically about the shaft 11 in the drilling in the motor flange 15. The ring pole is provided with an inner drilling whose diameter is greater than that of the shaft 11, thus forming a gap 27 which is filled with a magnetic liquid (ferrofluid). A cover 28 is provided above the ring pole 26 as a further measure to prevent the escape of magnetic liquid.

The diameter of the inner drilling 22 in the permanent magnet 21 can be increased to provide adequate magnetic flux in the gap 33 between the upper surface 31 of the disk-shaped portion 19 of the bearing ring 17 and the permanent magnet 21. This allows savings in the cost of the relatively expensive permanent magnet material. On the other hand, the outer diameter of the permanent magnet 21 can be reduced as well, thus decreasing the diameter of the seal and motor bearings, i.e. diameter of the motor itself can be reduced.

Finally, the sleeve-shaped portion 18 of the bearing ring 17 provides the bearing 12 with additional protection against harmful particles or possible ferrofluid spray losses. Even in case of failure of the ferrofluid seal the labyrinthine arrangement of the rotating part 17 between the ferrofluid seal (21, 26, 27) and the ball bearing 12 protects the clean chamber, such as in a storage disk drive, for example, against particles coming from the motor bearing 12.

What is claimed is:

1. A seal in which a permanent magnet provides excitation, comprising:
   a rotatable shaft having a straight cylindrical outer surface and supported in a ball bearing system, each ball bearing having an inner race and an outer race;
   a magnetically conductive bearing ring mounted on the shaft immediately adjacent one end of the bearing system, the bearing ring having two radial portions,
      a sleeve portion immediately surrounding the shaft and having a given axial dimension and
      a disk portion radially outwardly of the sleeve portion having an axial dimension less than that of the sleeve portion, the axial center of both portions lying in the same radial plane;
   a permanent magnet ring axially adjacent the bearing ring, the magnet ring having an inner diameter greater than the outer diameter of the sleeve portion of the bearing ring, the magnet ring opposing a substantial portion of the disk portion of the bearing ring;
   a labyrinth gap defined between the bearing system and the permanent magnet ring on both sides of the disk portion of the bearing ring radially extending therebetween;
   a ring pole having an inner diameter concentric with and greater than the shaft and located axially adjacent the permanent magnet ring on the side opposite the bearing system, the ring pole extending radially inwardly toward the shaft parallel to the sleeve portion of the bearing ring; and an active pole gap defined between the inner diameter of said ring pole and said shaft and filled with magnetically conductive fluid.

2. A seal according to claim 1, wherein the bearing ring firmly bears on one face of the inner race of a ball bearing.

3. A seal according to claim 2, wherein the bearing ring is firmly connected to the shaft and rotates together with it.

4. A seal according to claim 3, wherein the bearing ring is made in one piece.

5. A seal according to claim 4, wherein the bearing ring is force-fitted on the shaft at a short axial distance from the permanent magnet.

6. A seal according to claim 5 wherein the upper surface of the disk-shaped portion of the bearing ring lies at a short axial distance from the lower leading edge of the permanent magnet and is located essentially parallel and opposite said magnet.

7. A seal according to claim 6 wherein the permanent magnet is firmly fixed to the ring pole and exposes the bearing ring lie opposite one another.

8. A seal according to claim 1 wherein the magnetically conductive fluid is a ferrofluid.

* * * * *